Patented July 13, 1937

2,086,689

UNITED STATES PATENT OFFICE 2,086,689

CARBOCYANINE DYES AND PROCESS OF MANUFACTURING THE SAME

Walter Zeh, Dessau in Anhalt, Germany, assignor to Agfa Ansco Corporation, Binghamton, N. Y., a corporation of New York No Drawing. Application February 6, 1932, Serial No. 591,389. In Germany February 7, 1931

3 Claims. (Cl. 260—44)

My present invention relates to sensitizing of photographic emulsions.

One of its objects is to provide such an emulsion the sensitivity of which is raised over the range of wave lengths to which the emulsion is normally sensitive. Another object is the dyes incorporated in the emulsion, in order to increase their sensitivity. Further objects will be seen from the detailed specification following hereafter.

I have found that a silver-halide emulsion containing a dye of the general formula

*Formula 1*

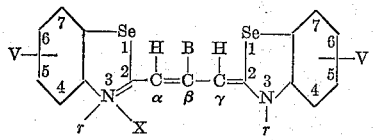

V=H, alkyl, alkoxy, substituted amino groups, halide,
B=H, alkyl,
r=alkyl,
X=halide, perchlorate, paratoluene sulfonate, alkylosulfate, nitrate, is sensitive to wave lengths extending from the green to the red region of the spectrum. The emulsion attains a remarkable sensitivity to the range of wave lengths from about $500\mu\mu$ to about $700\mu\mu$.

In general Formula 1 V may take any position in the benzene nuclei, however, the 5 and 6 position and the 5' and 6' position are preferred. V may represent alkyl, such as methyl, ethyl, etc. or an alkoxy, for instance, a methoxy or an ethoxy group, or halide, or an amino group both hydrogen atoms of which are replaced by alkyl or one of the hydrogen atoms being replaced by alkyl and the other by aryl, and finally one of the hydrogen atoms being replaced by an acyl radical. B may be H or alkyl such as methyl, ethyl, etc. r may represent alkyl, for instance, methyl or ethyl. X can be any suitable anion that will precipitate the dye, for instance, a halide, paratoluene sulfonate, alkylsulfate, perchlorate, nitrate, or the like.

The dyes are obtainable according to the desired solubility in form of the bromide, iodide, perchlorate, etc. and are used in a quantity as usual for the known sensitizing dyes. This quantity amounts for the trimethinecyanines which are not substituted in the carbon bridge to about 10 to 20 milligrams per 1 kg. of emulsion ready for being cast which contains about 9 per cent of gelatine, 4.5 per cent of silver-halide, the rest being water, and for the trimethinecyanines substituted in the carbon bridge to about 10 to 100 milligrams for the same quantity of silver-halide emulsion. Thus the range within which the added quantity of sensitizing material gives a good result is different for the sensitizers which are substituted in the carbon bridge and those which are not substituted in the carbon bridge. However I do not wish to limit my invention to the quantities just indicated, the most suitable amount will in each case be found by a few comparative experiments. The dyes may be added to the emulsion in form of solutions. Suitable solvents are the alcohols, for instance, methyl or ethyl alcohol which may be used anhydrous or diluted with water. The dyes are applied to the emulsion during any stage of its production, however, they are preferably added to the finished emulsion before being cast. The dyes may likewise be added by coating the emulsion with them or by bathing the finished photographic material in a bath in which the dye is dissolved. The dyes are suited for sensitizing an emulsion made according to the boiling process as well as for sensitizing an emulsion made according to the ammonia process.

The following examples serve to illustrate my invention.

*Example 1.*—The dye bis-[3-ethyl-5-methyl-benzselenazole - (2)] - trimethinecyanine iodide corresponding to the formula

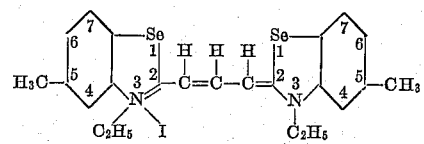

is obtainable as follows:

A solution of 5.5 grams of 2.5-dimethyl-benzselenazole-ethyl-iodide in 20 cc. of pyridine are boiled with 5 cc. of ethyl ortho-formate for about ½ hour. The dye is precipitated from this solution which has become bluish red, after cooling on addition of 80 cc. of water. Recrystallization from alcohol yields steel blue needles.

The alcoholic solution of the dye has an absorption maximum at a wave length of about $587\mu\mu$.

Incorporated in a silver-halide emulsion the dye imparts to it a range of sensitivity from about $510\mu\mu$ to about $670\mu\mu$ with a maximum at about $620\mu\mu$.

*Example 2.*—For producing the dye bis-[3- ethyl-5-ethoxy-benzselenazole-(2)]-trimethine-cyanine iodide corresponding to the formula

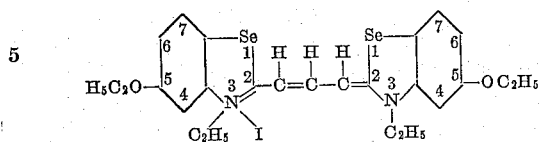

8 grams of 2-methyl-5-ethoxy-benzselenazole-ethyl-iodide in 40 cc. of pyridine are boiled with 8 cc. of ethyl ortho-formate for about ½ hour. The dye separates in form of green needles. After cooling the dye is filtered eventually after addition of a small quantity of an aqueous solution of potassium iodide. Recrystallized from methanol the dye is obtainable in form of green little rods.

The alcoholic solution of the dye has an absorption maximum at a wave length of about 597µµ.

Incorporated in a silver-halide emulsion the dye imparts to it a range of sensitivity from about 505µµ to about 690µµ with a maximum at about 628µµ.

*Example 3.*—The dye bis-[3-ethyl-6-methoxy-benzselenazole-(2)]-trimethinecyanine iodide corresponding to the formula

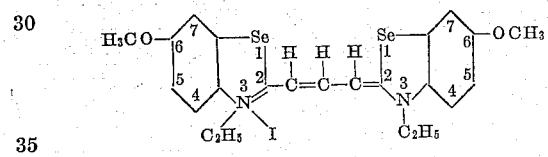

is produced by boiling 4 grams of 2-methyl-6-methoxy-benzselenazole-ethyl-iodide dissolved in 20 cc. of pyridine with 4 cc. of ethyl ortho-formate for about ½ hour and precipitating the formed dye by addition of a small quantity of an aqueous solution of potassium iodide of 5 per cent strength. After recrystallization from methanol a blue crystal powder is obtainable.

The alcoholic solution of the dye has an absorption maximum at a wave length of about 595µµ.

Incorporated in a silver-halide emulsion the dye imparts to it a range of sensitivity from about 505µµ to about 690µµ with a maximum at about 625µµ.

*Example 4.*—The dye bis-[3-ethyl-5-chloro-benzselenazole-(2)]-trimethinecyanine iodide corresponding to the formula

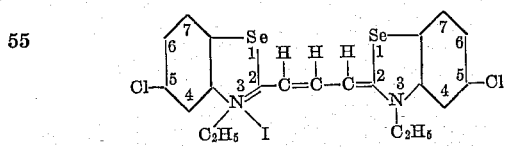

crystallizes from a solution of 4 grams of 2-methyl-5-chloro-benzselenazole-ethyl-iodide, 20 cc. of pyridine and 4 cc. of ethyl ortho-formate after having been boiled for about ½ hour in form of felted steel blue needles.

The alcoholic solution of the dye has an absorption maximum at a wave length of about 580µµ.

Incorporated in a silver-halide emulsion the dye imparts to it a range of sensitivity from about 520µµ to about 660µµ with a maximum at about 620µµ.

*Example 5.*—For producing the dye bis-[3-ethyl-benzselenazole-(2)]-β-methyl-trimethine-cyanine bromide corresponding to the formula

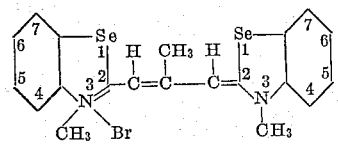

10 grams of 2-methyl-benzselenazole-dimethyl-sulfate in 20 cc. of pyridine are boiled with 10 cc. of ethyl ortho-acetate for about 2 hours. After cooling the mixture, the dye is precipitated by addition of about 80 to 100 cc. of an aqueous solution of potassium bromide. By recrystallization from methanol the dye is obtainable in form of a dark carmine red crystal powder.

The alcoholic solution of the dye has an absorption maximum at a wave length of about 555µµ.

Incorporated in a silver-halide emulsion the dye imparts to it a range of sensitivity from about 490µµ to about 690µµ with a maximum at about 605µµ.

*Example 6.*—For producing the dye bis-[3-ethyl-6-acetylamino-benzselenazole-(2)]-β-methyl-trimethinecyanine bromide corresponding to the formula

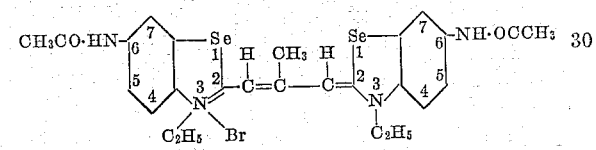

4 grams of 2-methyl-6-acetylamino-benzselenazole-diethylsulfate in 10 cc. of pyridine are boiled with 4 cc. of ethyl ortho-acetate for about ½ hour, whereupon the dye is precipitated by addition of a small quantity of an aqueous solution of potassium bromide of about 5 per cent strength. Recrystallization from alcohol yields steel blue needles.

The alcoholic solution of the dye has an absorption maximum at a wave length of about 580µµ.

Incorporated in a silver-halide emulsion the dye imparts to it a range of sensitivity from about 490µµ to about 700µµ with a maximum at about 600µµ.

*Example 7.*—The dye bis-[3-methyl-benzselenazole-(2)]-β-ethyl-trimethinecyanine bromide corresponding to the formula

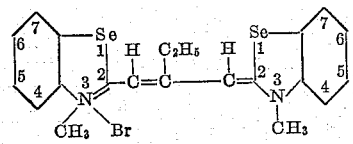

is obtainable by boiling for about ½ hour a mixture of 5 grams of 2-methyl-benzselenazole-dimethylsulfate, 10 cc. of pyridine and 5 cc. of ethyl ortho-propionic acid. After the addition of an aqueous solution of potassium bromide of about 5 per cent strength the dye precipitates from the dark bluish red solution in form of brownish red flakes.

The alcoholic solution of the dye has an absorption maximum at a wave length of about 560µµ.

Incorporated in a silver-halide emulsion the dye imparts to it a range of sensitivity from about 500µµ to about 700µµ with a maximum at about 655µµ.

*Example 8.*—The dye bis-[3-ethyl-5-methoxy-benzselenazole-(2)]-β-ethyl-trimethinecyanine perchlorate corresponding to the formula

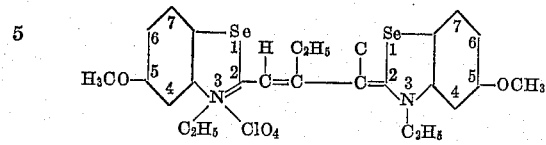

may be obtained by boiling for about ½ hour a mixture of 4 grams of 2-methyl-5-methoxy-benzselenazole-diethylsulfate, 10 cc. of pyridine and 4 cc. of ethyl ortho-propionate, and precipitating the dye by addition of a small quantity of an aqueous solution of sodium perchlorate of about 5 per cent strength. Recrystallization from methanol yields small green needles.

The alcoholic solution of the dye has an absorption maximum at a wave length of about $573\mu\mu$.

Incorporated in a silver-halide emulsion the dye imparts to it a range of sensitivity from about $490\mu\mu$ to about $720\mu\mu$ with a maximum at about $658\mu\mu$.

*Example 9.*—For producing the dye bis-[3-methyl-6-propionylamino-benzselenazole-(2)]-β-ethyl-trimethinecyanine bromide corresponding to the formula

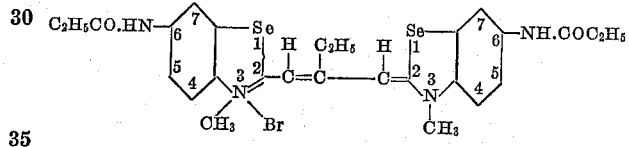

4 grams of 2-methyl-6-propionylamino-benzselenazole-dimethylsulfate in 20 cc. of pyridine are boiled for about ½ hour with 4 cc. of ethyl ortho-propionate. After the addition of a small quantity of an aqueous solution of potassium bromide of about 5 per cent strength the dye precipitates and may by recrystallization be obtained in form of a greenish red crystal powder.

The alcoholic solution of the dye has an absorption maximum at a wave length of about $575\mu\mu$.

Incorporated in a silver-halide emulsion the dye imparts to it a range of sensitivity from about $490\mu\mu$ to about $710\mu\mu$ with a maximum at about $590\mu\mu$.

The bases serving as a starting material for the production of the dyes are obtainable according to methods known from the preparation of the unsubstituted benzselenazoles.

It is to be understood that my invention is not limited to the foregoing examples nor to the specific details given therein. Numerous other embodiments are possible and I contemplate as included within my invention all such modifications and equivalents as fall within the scope of the appended claims. So, for instance, the benzene nuclei may contain one or more substituents.

What I claim is:

1. A bis-[3-alkyl-5-alkoxy-benzselenazole-(2)]-trimethinecyanine salt, the central carbon of the trimethenyl chain of which is substituted by a member selected from the group consisting of hydrogen and alkyl.

2. A bis-[3-alkyl-5-methoxy-benzselenazole-(2)]-β-ethyl-trimethinecyanine salt.

3. Bis-[3-ethyl-5-methoxy-benzselenazole-(2)]-β-ethyl-trimethinecyanine perchlorate.

WALTER ZEH.